H. W. WELSH.
HOPPER.
APPLICATION FILED SEPT. 17, 1910.
987,517.
Patented Mar. 21, 1911.
2 SHEETS—SHEET 1.
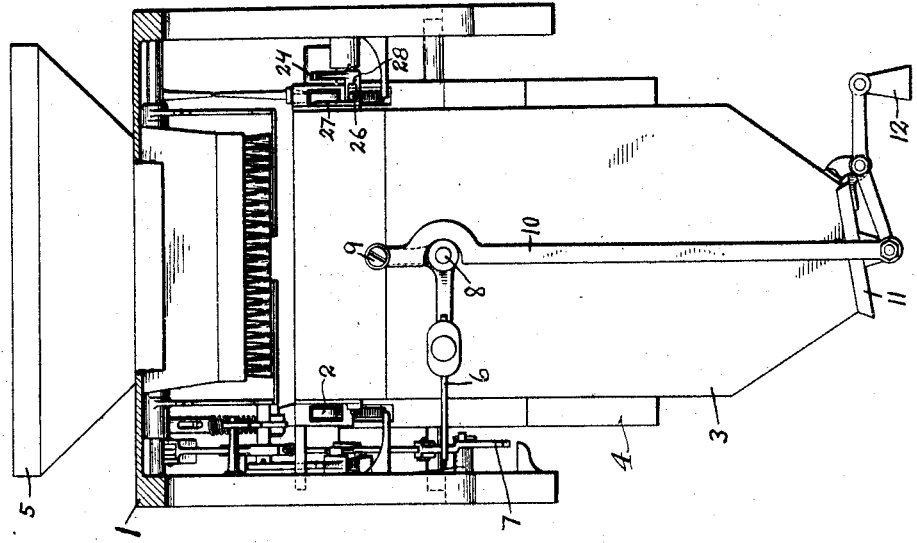
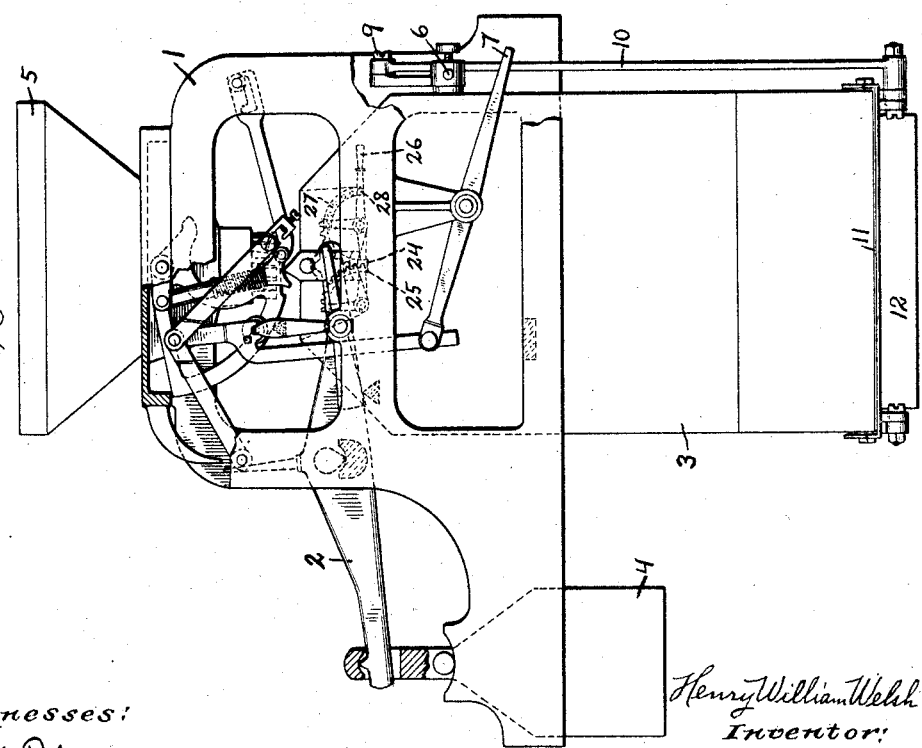
Witnesses:
Henry William Welsh
Inventor:
Attorneys.

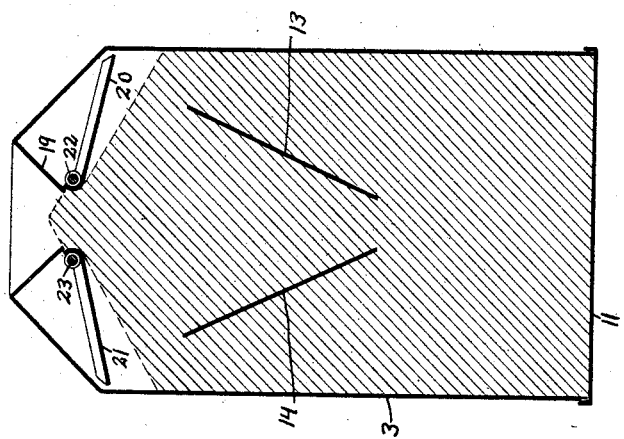
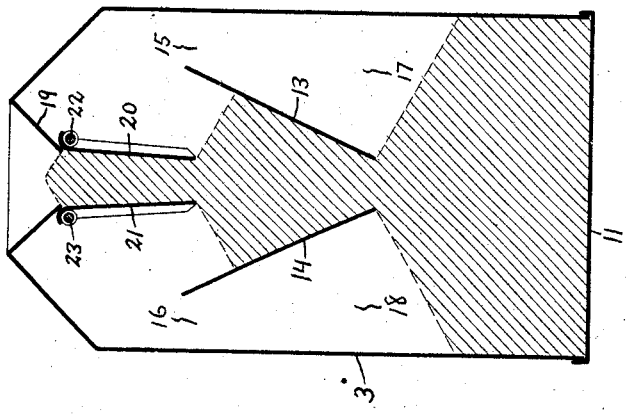

UNITED STATES PATENT OFFICE.

HENRY WILLIAM WELSH, OF NORTH MILWAUKEE, WISCONSIN, ASSIGNOR TO THE AVERY SCALE COMPANY, OF NORTH MILWAUKEE, WISCONSIN, A CORPORATION OF WISCONSIN.

HOPPER.

987,517. Specification of Letters Patent. Patented Mar. 21, 1911.

Application filed September 17, 1910. Serial No. 582,440.

*To all whom it may concern:*

Be it known that I, HENRY WILLIAM WELSH, a subject of the King of Great Britain, residing at North Milwaukee, in the county of Milwaukee and State of Wisconsin, have invented certain new and useful Improvements in Hoppers, of which the following is a specification, reference being had to the accompanying drawing, forming a part thereof.

This invention relates to hoppers for use with weighing scales or equivalent devices where the object sought is to have the hopper, which is intended to contain the material to be weighed or measured, adjustable so as to vary the amount of material it will contain or hold.

The volume of different materials for a selected or predetermined weight depends upon the specific gravity of the materials in bulk. That is to say the volume of one hundred pounds of wheat, for example, depends not only upon the specific gravity of the wheat kernels but also upon the spaces or voids between the kernels. It will be readily understood, therefore, that the volume of a particular material for a selected weight is a function of that weight and the specific gravity of the material in bulk or in the more or less divided state in which it may exist. It will also be readily understood that the weight of a selected or predetermined volume of a particular material is a function of that volume and the specific gravity of the material in bulk.

Materials are measured, customarily, either by volume or weight and the object of this invention is to provide a hopper or receptacle the holding or measuring capacity of which can be readily varied to meet the variations of the specific gravities in bulk of the materials to be measured or weighed in the manner to be more specifically described and claimed.

For convenience of description and illustration the hopper is shown as used with an automatic weighing scale.

Referring to the drawings which accompany this specification and form a part thereof, on which drawings the same reference characters are used to designate the same parts wherever they may appear in the several views, and which drawings illustrate an embodiment of this invention; Figure 1 is a side elevation of an automatic weighing scale and the hopper; Fig. 2 is an end elevation of the same, parts being broken away and parts being shown in section in each of said figures. Fig. 3 is a section of the hopper with the volume controlling means shown in one position; and Fig. 4 is a view similar to Fig. 3 but with the volume controlling means shown in a different position.

Referring specifically to the drawings, the reference numeral 1 designates the frame of an automatic weighing scale, 2 the scale beam fulcrumed thereon and upon which scale beam the hopper 3 and the scale weight or weight box 4 are supported.

The reference numeral 5 designates the spout or chute from which the material is intermittently and automatically delivered to the hopper 3 in any ordinary or preferred manner. In the specific scale illustrated, when the hopper 3 has received sufficient material to overbalance the weight 4 the hopper descends and in descending causes the outlet of the spout 5 to be closed thereby shutting off or interrupting the flow of material therefrom and as the hopper 3 continues to descend the lever 6 strikes the trip 7 turning said lever, which is a bell-crank lever, upon its pin 8 thereby swinging the stud 9, which pivotally connects the bell-crank lever 6 and the rod 10, out of line with the pin 8 so that the material in the hopper 3 opens the bottom closure 11, which is hinged to said hopper 3, and falls out of said hopper. When the material has fallen out of said hopper 3 the weight or weight box 4 descends and causes the hopper 3 to rise, the bottom closure 11 thereof being closed by the counter-balance weight 12, and as the hopper rises the outlet of the spout or chute is opened thereby permitting material to flow therefrom into the hopper 3 in a well-known manner.

The hopper 3 is provided on the interior thereof with a transverse partition 13 and preferably, in order to keep the material centrally disposed with respect to the hopper when the hopper is not to be completely filled with the material a second partition 14 is also placed transversely of the hopper in the same manner as partition 13 but located on the opposite side of the medial line of the hopper as clearly shown by Figs. 3 and 4 of the drawings, and preferably partitions 13 and 14 are inclined toward each other and toward the medial line of the hopper, as shown by Figs. 3 and 4 of the drawings. These partitions 13 and 14 make close joints with the hopper so that material cannot pass between said partitions and the sides of the hopper to which they are secured, but passageways 15 and 16 are provided between the upper ends of said partitions and the ends of the hopper, and passageways 17 and 18 are provided between the lower ends of said partitions and the ends of said hopper. The upper part of the hopper is provided with a funnel 19 to receive the material and adjacent to this funnel are pivotally supported two wings or flaps 20 and 21 which are the volume controlling means for controlling the volume of material to be received by the hopper. These wings or flaps 20 and 21 do not permit material to pass between their ends and the sides of the hopper and their length is such that they can be swung past the upper ends of the partitions 13 and 14. Preferably the wings or flaps 20 and 21 are connected to shafts 22 and 23 upon which and outside of the hopper are secured intermeshing gears 24 and 25 and one shaft or gear is provided with a handle 26 by the movement of which both gears, both shafts and both flaps 20 and 21 are moved simultaneously. Any form of locking means, as, for example, the quadrant 27 may be provided with which a pawl 28, carried by the handle 26, coacts to lock the flaps 20 and 21 in any predetermined position.

In the operation of the apparatus, suppose, for example, that it is desired to weigh a grain, say in 100 pound lots, the specific gravity of which in bulk is heavy. The flaps 20 and 21 are swung to such a position that their lower ends are inside of the upper ends of the partitions 13 and 14 (depending, of course, upon the particular grain, or any other material, to be weighed) and the hopper will be filled, as shown by the shaded part on Fig. 3 of the drawings, the rest of the interior of the hopper being left vacant or unfilled. Suppose now it is desired to weigh a grain, or any other material, say in 100 pound lots, the specific gravity of which in bulk is light, so that a greater volume of the grain or material is required to weigh 100 pounds than in the former case. The wings or flaps 20 and 21 are then swung so that their lower ends are above the tops of the partitions 13 and 14, as shown by Fig. 4 of the drawings, and the grain or material will then flow down inside of the partitions 13 and 14 and back of the same, as clearly shown by the shaded part on Fig. 4.

The wings or flaps 20 and 21 should be hinged or supported by the shafts at a sufficient height above the tops of the partitions 13 and 14 so that the wings or flaps 20 and 21 can be swung outwardly above the tops of the partitions 13 and 14 to at least the angle of repose of the material to be weighed or measured, and preferably beyond the angle of repose of the material to be weighed or measured, as shown by Fig. 4 of the drawings, to insure equal volumes in the hopper at each weighing or measuring operation as will be clearly understood.

The construction of hopper shown and described affords in effect a plurality of pockets within the hopper, some of which may be filled or not, as desired, the construction being such that the pockets can be readily filled by the grain or other material flowing thereinto, and can be readily emptied by the grain or other material flowing therefrom.

While the preferred construction of hopper is illustrated by the drawings and described in this specification, variations and modifications of said structure may be made without departing from the spirit and scope of this invention.

What is claimed is:

1. The combination with a hopper of a partition therein, arranged transversely and vertically with respect to the interior of the hopper, and adjustable volume controlling means for controlling the volume of material to be received by the hopper by confining the said material to one side of said partition or permitting the said material to fill the hopper on both sides of the said partition.

2. The combination with a hopper of transverse partitions secured therein so as to prevent material from passing between the ends of said partitions and said hopper, said partitions being spaced from said hopper at their tops and bottoms, and volume controlling means adapted to permit material to pass only between said partitions so as to only partially fill said hopper, or to permit material to pass both between and behind said partitions so as to completely fill said hopper.

3. The combination with a hopper of transverse partitions secured therein so as to prevent material from passing between the ends of said partitions and said hopper, said partitions being spaced from said hopper at their tops and bottoms, and flaps movably supported above said partitions so as to direct material between said partitions or to permit material to pass both between said partitions and back thereof so as to completely fill said hopper.

4. The combination with a hopper of transverse partitions secured therein so as to prevent material from passing between the ends of said partitions and said hopper, said partitions being spaced from said hopper at their tops and bottoms, flaps movably supported above said partitions so as to direct material between said partitions or to permit material to pass both between said partitions and back thereof so as to completely fill said hopper, and means for moving said flaps and holding them in adjusted positions.

5. The combination with a hopper provided with a plurality of pockets therein, of a funnel at the upper end of said hopper and adjustable volume controlling means in said hopper adjacent to said funnel for permitting material to pass from said funnel to one or more of said pockets.

In witness whereof I hereto affix my signature in presence of two witnesses.

HENRY WILLIAM WELSH.

Witnesses:
   CHAS. L. GOSS,
   FRANK E. DENNETT.

Copies of this patent may be obtained for five cents each, by addressing the "Commissioner of Patents, Washington, D. C."